(12) United States Patent
Eschborn et al.

(10) Patent No.: US 7,513,101 B2
(45) Date of Patent: Apr. 7, 2009

(54) SYNCHRONIZED MOTOR THRUST REVERSER ACTUATION SYSTEM

(75) Inventors: David M. Eschborn, Gilbert, AZ (US);
Guy L. Dilno, Chandler, AZ (US);
Michael J. Calmelat, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 529 days.

(21) Appl. No.: 11/262,058

(22) Filed: Oct. 28, 2005

(65) Prior Publication Data
US 2007/0095049 A1    May 3, 2007

(51) Int. Cl.
*F02K 1/54* (2006.01)
(52) U.S. Cl. .............. 60/204; 60/226.2; 244/110 B; 239/265.29
(58) Field of Classification Search .......... 60/204, 60/226.2, 230; 244/110 B; 239/265.19, 239/265.29, 265.31
See application file for complete search history.

(56) References Cited

U.S. PATENT DOCUMENTS

| | | | |
|---|---|---|---|
| 2,819,589 A | 1/1958 | Geyer | |
| 3,500,646 A | 3/1970 | Hom et al. | |
| 3,724,759 A | 4/1973 | Ellis | |
| 4,458,582 A | 7/1984 | Linton | |
| 5,280,704 A | 1/1994 | Anderson et al. | |
| 5,685,141 A | 11/1997 | Markenstein et al. | |
| 6,094,908 A | 8/2000 | Baudu et al. | |
| 6,622,474 B1 | 9/2003 | Sternberger et al. | |
| 6,666,307 B1 | 12/2003 | Christensen | |
| 6,837,054 B2 | 1/2005 | Brocard et al. | |
| 2003/0066283 A1* | 4/2003 | Ahrendt | 60/226.2 |
| 2004/0139725 A1 | 7/2004 | Colotte et al. | |
| 2004/0139726 A1 | 7/2004 | Collette et al. | |
| 2006/0101806 A1* | 5/2006 | Ahrendt | 60/226.2 |

FOREIGN PATENT DOCUMENTS

| | | |
|---|---|---|
| EP | 1004798 A1 | 5/2000 |
| EP | 1280029 A2 | 1/2003 |
| WO | 2004022963 A1 | 3/2004 |

OTHER PUBLICATIONS

EP Search Report, 06117902.4, dated Feb. 29, 2008.

* cited by examiner

*Primary Examiner*—Ted Kim
(74) *Attorney, Agent, or Firm*—Ingrassia, Fisher & Lorenz, P.C.

(57) ABSTRACT

A thrust reverser actuation system is provided that includes a synchronization system that synchronizes the actuation of at least two actuators coupled to at least two power drive units. The synchronization system includes a first synchronization shaft coupling the first power drive unit to the second power drive unit and a second synchronization shaft coupling the first power drive unit to the second power drive unit. The at least two actuators are adapted to receive a drive force and configured, in response to receipt of the drive force, to move between a stowed position and a deployed position. The synchronization system is configured to transfer power between the first power drive unit and the second power drive unit, thereby eliminating a mismatch in power and provide uniform deployment of the at least two actuators.

21 Claims, 4 Drawing Sheets

SYNCHRONIZED MOTOR THRUST REVERSER ACTUATION SYSTEM

STATEMENT REGARDING FEDERALLY SPONSORED RESEARCH OR DEVELOPMENT

This invention was made with Government support under contract number F33657-02-C-2000 awarded by Middle River Aircraft Systems (MRAS). The Government has certain rights in this invention.

FIELD OF THE INVENTION

The present invention relates to aircraft engine thrust reverser actuation systems and, more particularly, to a thrust reverser system including a synchronized pneumatic actuation system.

BACKGROUND OF THE INVENTION

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position. In the stowed position, the thrust reversers do not redirect the jet engine's thrust.

The moveable thrust reverser components in each of the above-described designs are moved between the stowed and deployed positions by actuators. Power to drive the actuators may come from a dual output power drive unit (PDU), which may be electrically, hydraulically, or pneumatically operated, depending on the system design. A drive train that includes one or more drive mechanisms, such as flexible rotating shafts, may interconnect the actuators and the PDU to transmit the PDU's drive force to the moveable thrust reverser components.

Each of the above-described thrust reverser system configurations is robustly designed and is safe and reliable. Nonetheless, analysis has shown that damage to various portions of the thrust reverser system may result under certain circumstances. For example, if one of the actuators coupled to one of the PDU outputs becomes out of sync with the other actuators in the thrust reverser system, the deployment of the transcowls will be mismatched. Without synchronization, movement of the two independent transcowls results in abnormally high torsional loads at the interface of the engine mount pylon and the aircraft wing. Furthermore, this condition may result in damage to the moveable thrust reverser components. Repairing such damage can be costly and result in aircraft down time. One solution is to include numerous, independently operated torque limiters or decoupler assemblies in each drive train coupled to the PDU outputs. However, this solution would increase the system cost and/or weight.

Accordingly, there is a need for a thrust reverser system that improves upon one or more of the drawbacks identified above. Namely, a system that corrects for a mismatch in power between two independent power drive units. The system would provide synchronized deployment of the transcowls without significantly increasing the cost and/or the weight of the thrust reverser system components. The present invention addresses one or more of these needs.

SUMMARY OF THE INVENTION

The present invention provides a thrust reverser system actuator assembly that includes a synchronization assembly to maintain uniform movement of two independent transcowls. In one embodiment, and by way of example only, a thrust reverser actuation system includes at least two power drive units, at least two drive mechanisms, at least two actuator assemblies and a synchronization assembly. The power drive units are independently operable to supply a drive force, and each drive mechanism is coupled to receive the drive force from the coupled power drive unit. Each actuator assembly is coupled to one of the drive mechanisms and includes an actuator. A synchronization assembly, including two flexible synchronizing shafts links the power drive units to provide a power transfer between the at least two power drive units to time the actuators into a uniform deployment. Each of the at least two actuators is coupled to receive the drive force from one of the drive mechanisms, the actuator has at least one end that rotates in response to the drive force, and is configured to move, upon receipt of the drive force, between a stowed position and a deployed position.

In another exemplary embodiment, thrust reverser synchronization assembly includes a first synchronization shaft coupling together a first power drive unit and a second power drive unit. The first and second synchronization shafts are configured to transfer power between the first and second power drive units as a result of a mismatch in power between the first and second power drive units. The first and second synchronization shafts provide redundant coupling of the first and second power drive units, thereby limiting torsion loads to the at least two actuators coupled to each of the first and second power drive units and providing uniform movement of a first and second independent transcowl.

In yet another exemplary embodiment, disclosed is a method of synchronizing the deployment of at least two actuators including the sensing a mismatch in power between a first power drive unit and a second power drive unit. When a mismatch occurs, power is transferred between the first power drive unit and the second power drive unit to eliminate the mismatch. The power is transferred through a plurality of redundant synchronization shafts coupling the first and second power drive units.

Other independent features and advantages of the preferred thrust reverser system and actuator will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other thrust reverser actuation system designs, including those described above and those known now or hereafter in the art.

Figure 1:
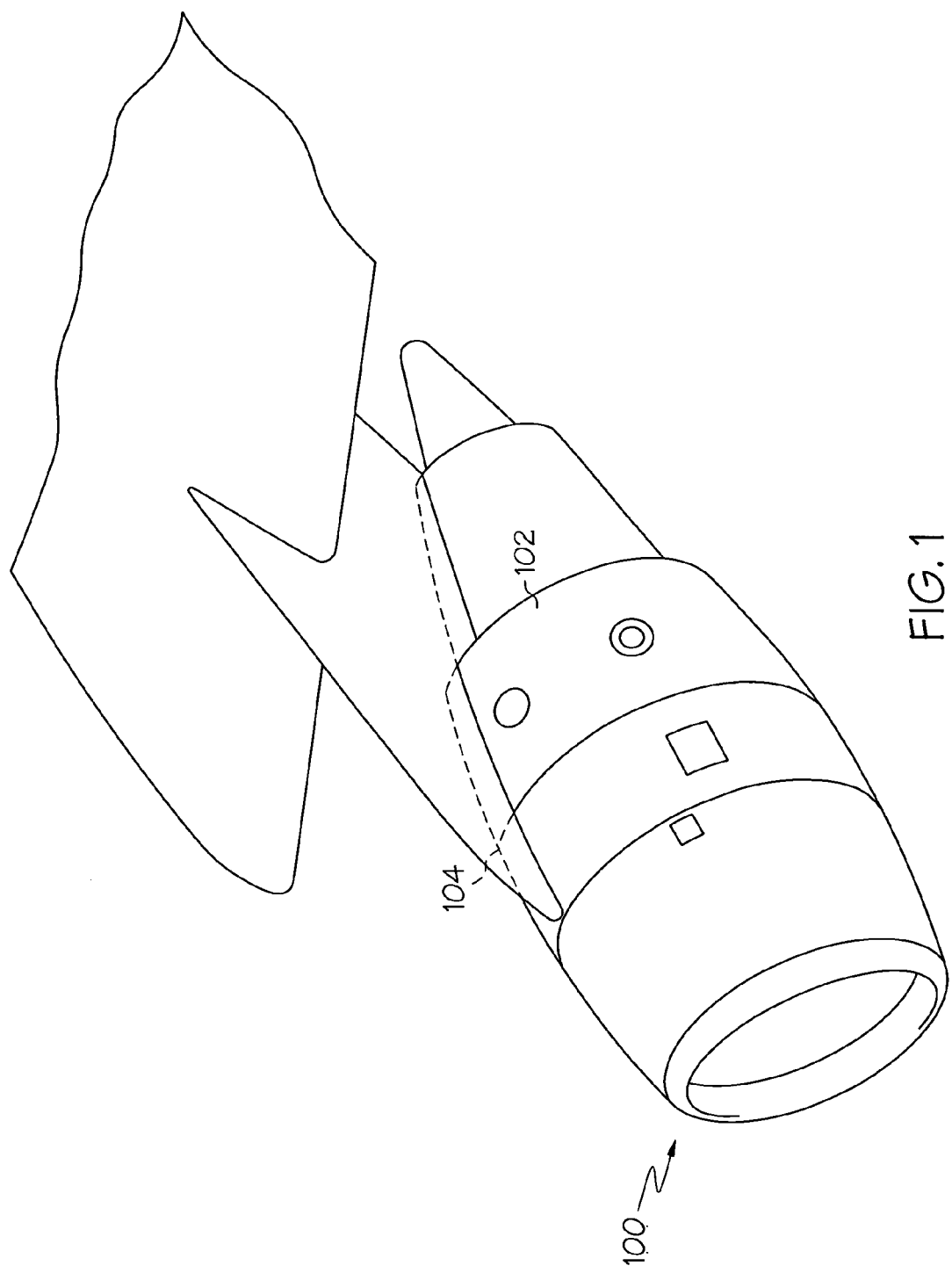
FIG. 1 is a perspective view of portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 that are positioned circumferentially on the outside of the fan case 100. The transcowls 102 and 104 cover a plurality of non-illustrated cascade vanes. A mechanical link 202 (see FIG. 2), such as a pin or latch, may couple the transcowls 102 and 104 together to maintain the transcowls 102 and 104 in correct alignment on non-illustrated guides on which the transcowls 102 and 104 translate. When the thrust reversers are commanded to deploy, the transcowls 102 and 104 are translated aft. This, among other things, exposes the cascade vanes, and causes at least a portion of the air flowing through the engine fan case 100 to be redirected, at least partially, in a forward direction. This re-direction of air flow in a forward direction creates a reverse thrust, and thus works to slow the airplane.

Figure 2:
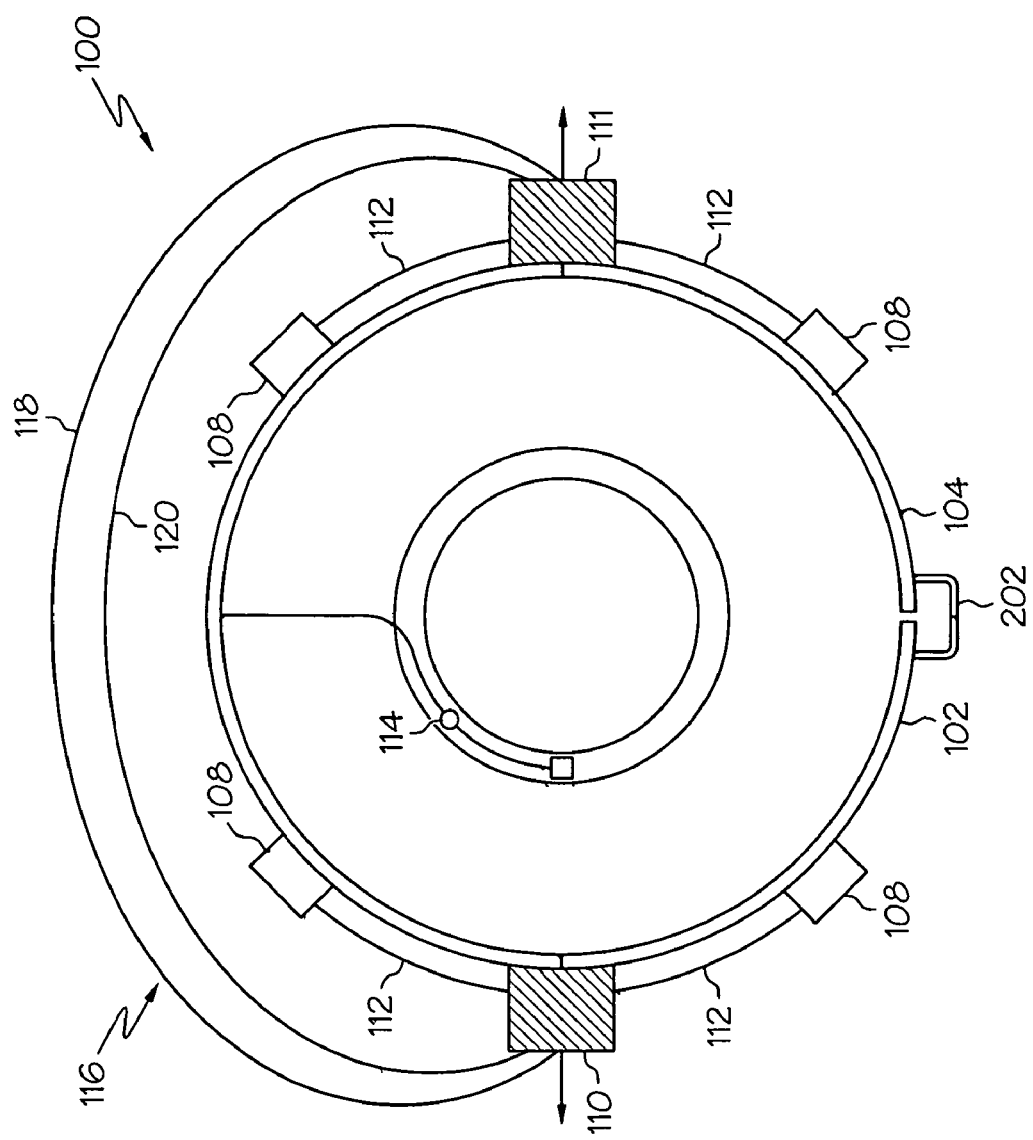
FIG. 2 is a simplified end view of a thrust reverser actuation system according to an exemplary embodiment of the present invention.

As shown more clearly in FIG. 2, a plurality of actuator assemblies 108 are individually coupled to the transcowls 102 and 104. In the depicted embodiment, half of the actuator assemblies 108 are coupled to one of the transcowls 102, and the other half are coupled to another transcowl 104. While not critical to understand or enable the present invention, it is noted that some or all of the actuator assemblies 108 may include locks, some or all of which may include position sensors. The actuator assemblies 108 used in the thrust reverser system 100 may be any one of numerous actuator designs presently known in the art or hereafter designed. However, in the depicted embodiment the actuator assemblies 108 are ballscrew type end actuators. It is additionally noted that the number and arrangement of the actuator assemblies 108 is not limited to what is depicted in FIG. 2, but could include other numbers of actuator assemblies 108 as well. The number and arrangement of actuators is selected to meet the specific design requirements of the system.

The actuator assemblies 108 are interconnected via a plurality of drive mechanisms 112, each of which, in the particular depicted embodiment, is a flexible shaft. Using flexible shafts in this configuration preferably ensures that the actuator assemblies 108 and the transcowls 102 and 104 move in a substantially synchronized manner. For example, when one transcowl 102 is moved, the other transcowl 104 is moved a like distance at substantially the same time.

At least two power drive unit (PDU) assemblies 110 and 111 are coupled to the actuator assemblies 108 on each transcowl 102, 104 via one or more flexible shafts 112. The PDU assemblies 110 and 111 are controlled by a control valve 114 and share a common pneumatic supply (not shown). The control valve 114 receives commands from a non-illustrated controller that provides appropriate activation and deactivation signals to the PDU assemblies 110 and 111 in response to the received commands. In turn, the PDU assemblies 110 and 111 each supply a drive force to their respective actuator assemblies 108 via the flexible shafts 112. In the illustrated embodiment, the PDU assemblies 110 and 111 each supply a drive force to a first and second actuator assembly. As a result, the actuator assemblies 108 cause the transcowls 102 and 104 to translate between the stowed and deployed positions.

Thrust reverser system 100 further includes a synchronization assembly 116 that redundantly couples the PDU assemblies 110 and 111 and provides synchronization of the actuator assemblies 108, and thus transcowls 102 and 104. More specifically, synchronization of actuator assemblies 108 includes at least two flexible synchronizing shafts. A first synchronization shaft 118, also referred to herein as a forward synchronization shaft, couples PDU assemblies 110 and 111. A second synchronization shaft 120, also referred to herein as an aft synchronization shaft, also couples PDU assemblies 110 and 111. First synchronization shaft 118 and second synchronization shaft 120 are configured to transfer power between PDU assemblies 110 and 111 for synchronizing movement of the actuators 108 associated with transcowl 102 with movement of the actuators 108 associated with transcowls 104. In that first synchronization shaft 118 and second synchronization shaft 120 are similarly configured and connected to PDU assemblies 110 and 111, they serve as redundant synchronization assemblies. In this particular embodiment, dual synchronizing shafts have been utilized to provide a fault tolerant actuation system. It is appreciated that a single synchronization shaft could be utilized in synchronization assembly 116 when so needed or desired.

Figure 3:
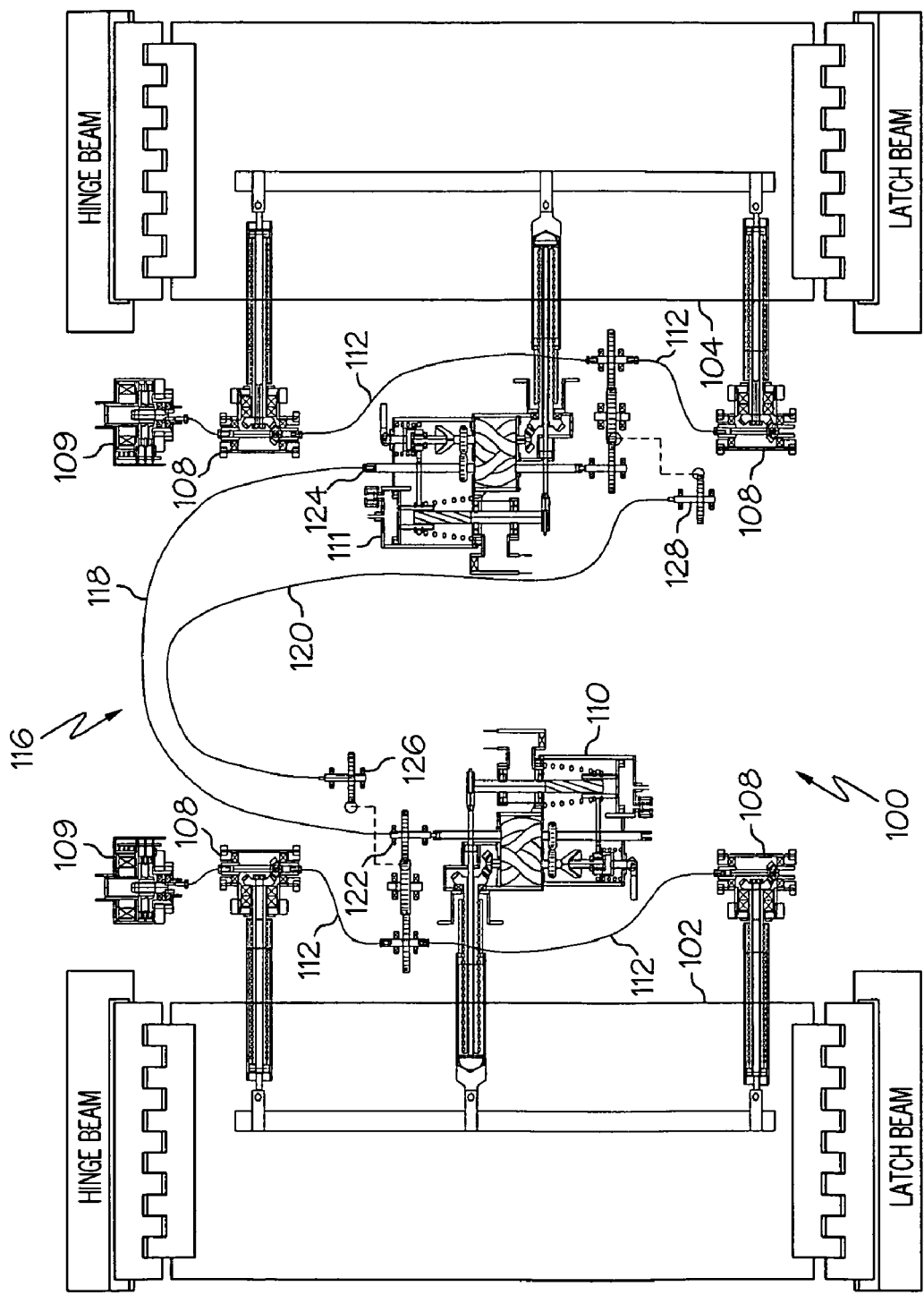
FIG. 3 is a cross section view of the thrust reverser actuation system shown in FIG. 2 showing a synchronization assembly according to an exemplary embodiment of the present invention.

Referring now to FIG. 3, is a more detailed view of thrust reverser system 100 in which dual flexible shafts, previously referred to as the first synchronization shaft 118 and the second synchronization shaft 120, are illustrated. Thrust reverser system 100, including synchronization assembly 116, is described as a mechanically-governed system. More specifically, each PDU assembly provides its own means of slowing down at the end of either deploy or stow stroke without the need for a feedback control system.

As illustrated, in a preferred embodiment first synchronization shaft 118 couples PDU 110 to PDU 111. More specifically, in a preferred embodiment first synchronization shaft 118 couples a forward outboard gear box drive pad 122 of PDU 110 to a brake housing drive pad 124 of PDU 111. Second synchronization shaft 120 redundantly couples PDU 110 to PDU 111. More specifically, second synchronization shaft 120 couples an aft outboard gear box drive pad 126 of PDU 110 to an aft inboard gear box drive pad 128 of PDU 111.

During operation, first synchronization shaft 118 and second synchronization shaft 120, connected directly to PDU 110 and PDU 111, are capable of correcting a mismatch in the unlikely event one of the PDUs 110 or 111 is rotating faster or slower than the other PDU. This mismatch in rotational speed may be due to frictional drag on the sliding track of one of the transcowls 102 or 104 or due to other mechanical inefficiency differences between actuation components. Furthermore, an increase or decrease in torque on one of the synchronization shafts 118 or 120, and a reduction in deflection of the shaft would translate to non-synchronous operation and a possible mismatch in actuation of the transcowls. It is appreciated that frictional drag and an increase or decrease in torque on one of the synchronization shafts 118 or 120 would translate into a noticeable change in the mechanical timing of the system.

In such a mismatch situation, power is transferred between PDU 110 and PDU 111 via first synchronization shaft 118 and second synchronization shaft 120. It should be noted that power is transferred in either direction e.g. decreasing power of PDU 110 and increasing power of PDU 111, or vice versa to provide synchronization. Synchronization assembly 116 enables the mismatch of the rotational speed and position to be eliminated, thereby synchronizing the deployment of actuators 108 associated with transcowls 102 and actuators 108 associated with transcowls 104, and ultimately the deployment of transcowls 102 and 104 (FIG. 2). The transfer of power between PDU 110 and PDU 111 and correction of the mismatch, tends to equalize torsion loads to the actuators 108.

FIG. 3 further illustrates the inclusion in this specific embodiment of a plurality of tertiary locks 109, forming a redundant locking system. Tertiary locks 109 are typically provided in addition to a primary locking system built into each of PDU 110 and 111. Tertiary locks 109 prevent inadvertent deployment of transcowls 102 and 104.

Figure 4:
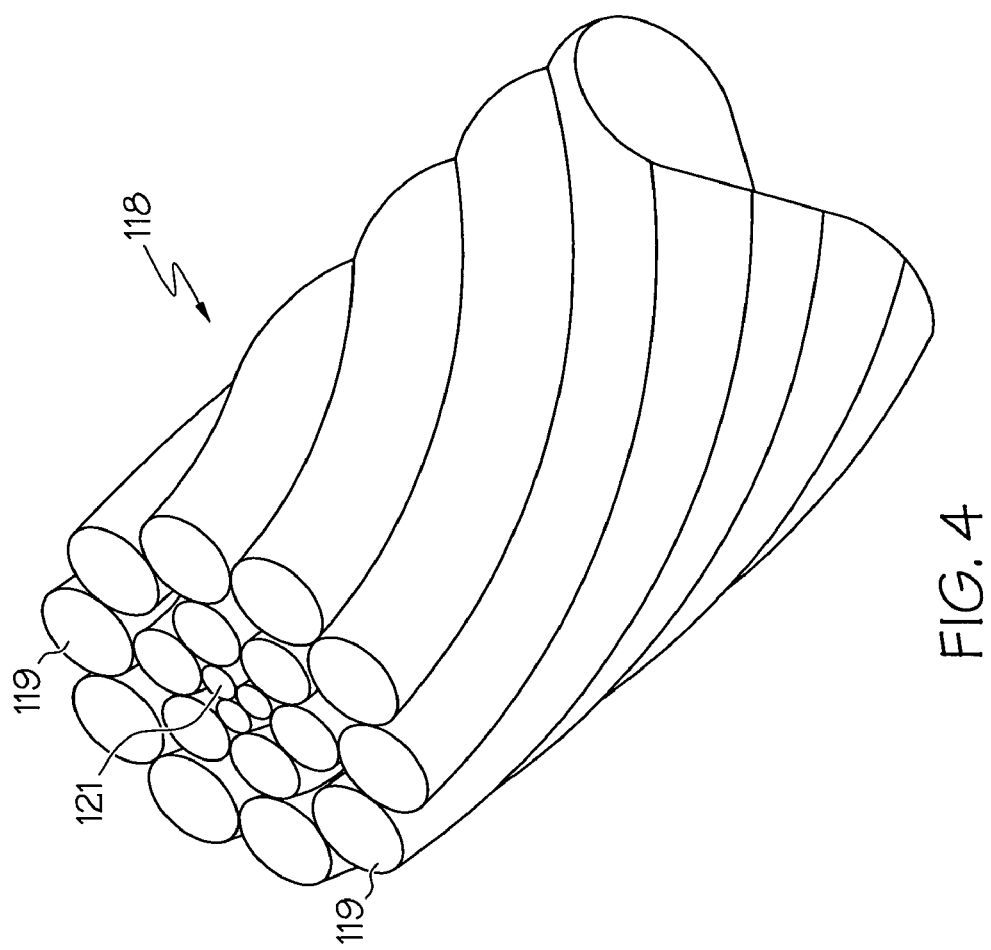
FIG. 4 is a three-dimensional cross-sectional view of a flexible synchronization shaft according to an exemplary embodiment of the present invention.

Referring now to FIG. 4, illustrated is an exemplary embodiment of the first synchronization shaft 118. It should be appreciated in a preferred embodiment that second synchronization shaft 120 is formed in generally a same manner as first synchronization shaft 118. As illustrated, the first synchronization shaft 118 is formed of a plurality of steel wires 119 that are helically wound in opposed direction so as to withstand torque in either direction. A single steel wire strand, or a plurality of steel wire strands 121 serves as a central core. Shafts 118 and 120 are preferably segmented to eliminate thermal and helical growth. In a preferred embodiment, first and second synchronization shafts 118 and 120 are positioned over an uppermost aspect of an aircraft engine through the engine pylon. This positioning over the aircraft engine provides for longer synchronizing shafts and thus improved torsional limits, while reducing loads on the transcowls 102 and 104. To accomplish such positioning, the overall length of shafts 118 and 120 may not be equal.

A thrust reverser actuation system has now been provided that includes a synchronization assembly that eliminates mismatch in transcowl deployment. The synchronization assembly directly couples the motors of a two independent power systems that share a common pneumatic supply. The direct coupling of the motors provides for a transfer of power between the motors during a power mismatch occurrence, and eliminates a mismatch in actuator deployment.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A thrust reverser actuation system, comprising:
   at least two power drive units each independently operable to supply a drive force;
   at least two drive mechanisms each coupled to receive the drive force from one of the at least two power drive units;
   at least two actuators, each actuator coupled to one of the at least two drive mechanisms to receive the drive force from one of the at least two drive mechanisms, each of the at least two actuators having at least one end that rotates in response to the drive force and configured to move, upon receipt of the drive force, between a stowed position and a deployed position; and
   a synchronization assembly redundantly coupling together the at least two power drive units and configured to transfer power between the at least two drive units to synchronize movement of the at least two actuators, the synchronization assembly comprising a first flexible shaft coupling a first power drive unit to a second power drive unit and a second flexible shaft coupling the first power drive unit to the second power drive unit, wherein each of the first flexible shaft and the second flexible shaft is configured to provide power transfer between the first and second power drive units.

2. The system of claim 1, wherein the thrust reverser actuation system is a mechanically-governed system.

3. The system of claim 1, wherein the at least two actuators comprise a first end actuator and a second end actuator coupled to each of the at least two drive mechanisms.

4. The system of claim 1, wherein the first flexible shaft has a first end coupled to a forward outboard gear box drive pad of the first power drive unit and a second end coupled to a brake pad housing drive pad of the second power drive unit.

5. The system of claim 1, wherein the second flexible shaft has a first end coupled to an aft outboard gear box drive pad of the first power drive unit and a second end coupled to an aft inboard gear box drive pad of the second power drive unit.

6. The system of claim 1, wherein the first flexible shaft and the second flexible shaft comprise helically wound steel wires.

7. The system of claim 1, wherein the first flexible shaft and the second flexible shaft are positioned over a top of an aircraft engine through a pylon.

8. The system of claim 1, wherein the first flexible shaft and the second flexible shaft are segmented to withstand thermal and helical growth.

9. A thrust reverser actuation system, comprising:
a first power drive unit operable to supply a drive force;
a second power drive unit operable to supply a drive force;
at least two actuators coupled to the first power drive unit and adapted to receive a drive force, each of the at least two actuators having at least one end that rotates in response to the drive force and configured, in response to receipt of the drive force, to move between a stowed position and a deployed position;
at least two actuators coupled to the second power drive unit and adapted to receive a drive force, each of the at least two actuators having at least one end that rotates in response to the drive force and configured, in response to receipt of the drive force, to move between a stowed position and a deployed position; and
a synchronization assembly redundantly coupling together the first power drive unit and the second power drive unit and configured to transfer power between the first and second power drive units as a result of a mismatch in power between the first and second power drive units, thereby limiting torsion loads to the at least two actuators coupled to the first power drive unit and the at least two actuators coupled to the second power drive unit and provide uniform deployment of a first and second independent transcowls, the synchronization assembly comprising a first flexible shaft coupling the first power drive unit to the second power drive unit and second flexible shaft coupling the first power drive unit to the second power drive unit, wherein each of the first and second flexible shafts are configured to provide a transfer of power between the first and second power drive units.

10. The system of claim 9, wherein the at least two actuators coupled to the first power drive unit comprise a first end actuator and a second end actuator.

11. The system of claim 10, wherein the at least two actuators coupled to the second power drive unit comprise a first end actuator and a second end actuator.

12. The system of claim 9, wherein the first flexible shaft has a first end coupled to a forward outboard gear box drive pad of the first power drive unit and a second end coupled to a brake pad housing drive pad of the second power drive unit.

13. The system of claim 9, wherein the second flexible shaft has a first end coupled to an aft outboard gear box drive pad of the first power drive unit and a second end coupled to an aft inboard gear box drive pad of the second power drive unit.

14. The system of claim 9, wherein the first flexible shaft and the second flexible shaft comprise helically wound steel wires.

15. The system of claim 9, wherein the first flexible shaft and the second flexible shaft are segmented for thermal and helical growth.

16. A thrust reverser synchronization assembly coupled to a first power drive unit and a second power drive unit and configured to provide synchronized deployment of at least one actuator coupled to the first power drive unit and at least one actuator coupled to the second power drive unit, the thrust reverser synchronization assembly comprising:
a first synchronization shaft coupling together the first power drive unit and the second power drive unit and configured to transfer power between the first and second power drive units as a result of a mismatch in power between the first and second power drive units; and
a second synchronization shaft coupling together the first power drive unit and the second power drive unit and configured to transfer power between the first and second power drive units as a result of a mismatch in power between the first and second power drive units,
wherein the first and second synchronization shafts provide redundant coupling of the first and second power drive units, thereby limiting torsion loads to the at least two actuators coupled to each of the first and second power drive units and providing uniform movement of a first and second independent transcowl.

17. The synchronization assembly of claim 16, wherein the first flexible shaft has a first end coupled to a forward outboard gear box drive pad of the first power drive unit and a second end coupled to a brake pad housing drive pad of the second power drive unit.

18. The synchronization assembly of claim 16, wherein the second flexible shaft has a first end coupled to an aft outboard gear box drive pad of the first power drive unit and a second end coupled to an aft inboard gear box drive pad of the second power drive unit.

19. The synchronization assembly of claim 16, wherein the first flexible shaft and the second flexible shaft comprise segmented helically wound steel wires.

20. In a thrust reverser actuation system having at least two actuators coupled to a first power drive unit and at least two actuators coupled to a second power drive unit, a method of synchronizing the deployment of the plurality of at least two actuators, comprising:
sensing a mismatch in power between the first power drive unit and the second power drive unit; and
transferring power between the first power drive unit and the second power drive unit to eliminate the mismatch, wherein the power is transferred through a plurality of redundant synchronization shafts coupling the first and second power drive units.

21. The method of claim 20, wherein the step of transferring power between the first and second power drive units includes transferring power through a first synchronization shaft coupling the first and second power drive units and a second synchronization shaft coupling the first and second power drive units.

* * * * *